Jan. 3, 1967  P. W. DIPPOLITO  3,295,513
ACOUSTIC BRIDGE FOR IMPEDANCE MEASUREMENTS OF THE EAR
Filed June 16, 1964
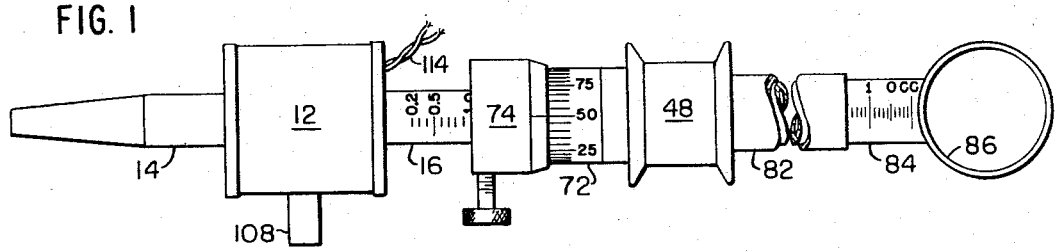
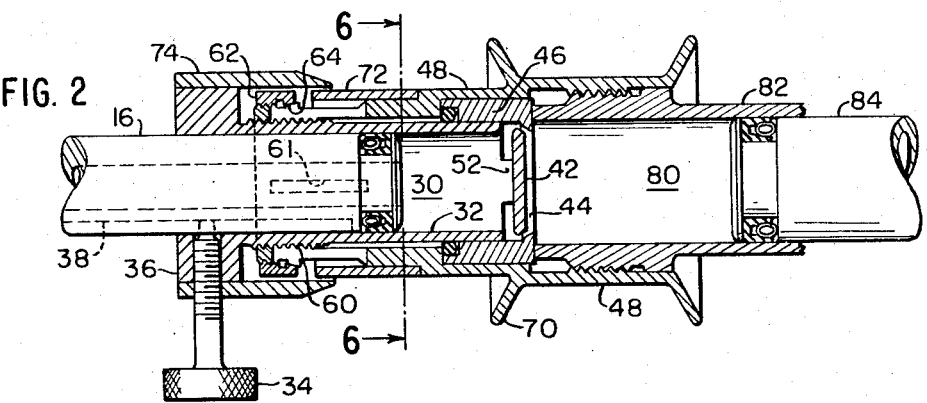
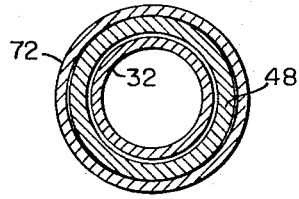
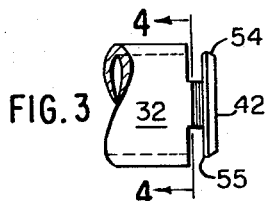
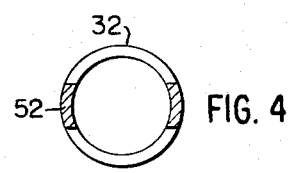
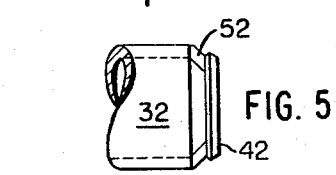
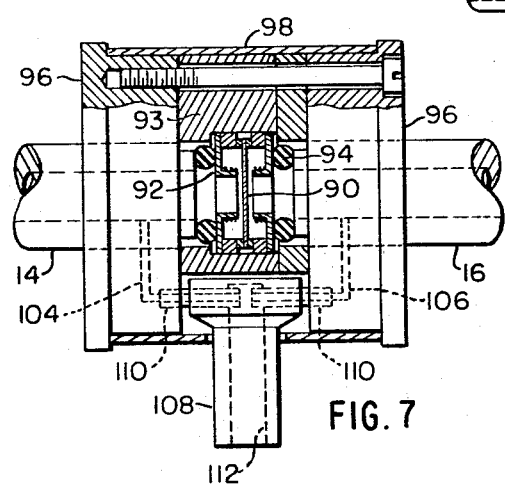
INVENTOR.
PAUL W. DIPPOLITO
BY
ATTORNEYS

United States Patent Office 3,295,513
Patented Jan. 3, 1967

3,295,513
ACOUSTIC BRIDGE FOR IMPEDANCE MEASUREMENTS OF THE EAR
Paul W. Dippolito, Weston, Mass., assignor to Grason-Stadler Company, Inc., West Concord, Mass., a corporation of Massachusetts
Filed June 16, 1964, Ser. No. 375,532
12 Claims. (Cl. 128—2)

The present invention relates to an acoustic bridge by which the impedance characteristics of the human ear may be determined.

As pointed out by Zwislocki in a paper entitled "Acoustic Measurement of the Middle Ear Function" (Annals of Otology, Rhinology & Laryngology, vol. 70, page 599 (1961)), information useful in the diagnosis and treatment of the ear may be obtained by measurements of the acoustic characteristics of the reflected wave when the ear drum is exposed to sound energy of predetermined controllable frequency and intensity. Apparatus for performing such measurements in order to determine the acoustic impedance at the ear drum has recently become available, and the present invention is concerned with improvements in such apparatus to facilitate the operation thereof and to increase the precision of the results obtained.

In particular, it is an object of the invention to provide an acoustic bridge for measuring acoustic impedances, having an improved variable acoustic resistance within the apparatus, so that the resistive and reactive components of the acoustic impedance may be more precisely determined.

It is also an object to provide an acoustic bridge having an improved transducer mounting arrangement that minimizes any adverse effect of the transducer mounting on the acoustic characteristics of the bridge.

In the drawings illustrating the invention,

FIG. 1 is a general view of the acoustic bridge.

FIG. 2 is a longitudinal sectional detail of the apparatus in the region of the adjustable impedance-determining elements.

FIG. 3 is a detail view in side elevation of one element of the variable resistance.

FIG. 4 is a sectional detail thereof taken on the line 4—4 of FIG. 3.

FIG. 5 is a top view of the element shown in FIG. 3.

FIG. 6 is a transverse section through the apparatus taken on the line 6—6 of FIG. 1.

FIG. 7 is a view, partly broken away and in section, showing construction and assembly details of the transducer and null-detecting portion of the bridge.

The type of acoustic bridge with which the present invention is concerned is illustrated in FIG. 1. A symmetrical transducer unit indicated generally at 12 is coupled to the ear by a first tube 14, hereinafter termed the ear tube, which is adapted to be inserted within the ear canal of the subject to be examined. A second tube 16 having a passage equal in length and diameter to the passage in ear tube 14 couples the other side of the transducer to the adjustable impedance-measuring elements of the bridge. During an ear examination to determine the acoustic impedance, the transducer is energized by an electrical signal of suitable frequency and magnitude and the impedance-determining elements adjusted by the operator until the optimum settings for balance are obtained, as determined by the signals detected by suitable means connected to the bridge output.

The variable impedance elements of the bridge contain both reactive and resistive components which may be separately adjusted. Provision is also made for compensating for the volume of the portion of the ear canal between the ear drum of the subject and the adjacent inner end of the ear tube 14. The compensation for variations in ear canal volume beyond the end of the ear tube is obtained by providing a chamber 30 of adjustable volume into which the end of second tube 16 opens. For purpose of this adjustment, tube 16 is mounted in telescoping relation within sleeve 32, hereinafter termed the valve sleeve, since it carries one element of the variable resistance slit. A suitable resilient seal in the nature of an O-ring or a spring-loaded seal ring is mounted in a groove adjacent the end of the tube. Thumb screw 34 in the enlarged end portion 36 of sleeve 32 serves to clamp the tube 20 in adjusted position within the sleeve, the tip portion of the screw extending into a longitudinal slot 38 in tube 16 to prevent relative rotation of the parts when the thumb screw is loosened during adjustment of chamber volume.

The outside of the tube 16 carries appropriate markings so that the position of the tube within the sleeve may be adjusted to cause the volume of the compensating chamber 30 to equal that of the ear canal volume inwardly of the tip of ear tube 14. Such volume is obtained by attaching a special fitting to the tube 14 and inserting the same in the ear canal, and then filling the remaining volume of the ear canal with a suitable fluid from a calibrated dispenser such as a syringe. The bridge and special fitting are then removed, the ear canal emptied of the liquid, and the tube 16 adjusted within sleeve 32 to the setting corresponding to the measured volume.

The variable acoustic resistance is provided by an adjustable circular slit between a disc 42 and the conical seat 44 of valve seat insert 46 which is secured within the main housing 48. As the accuracy of the measurements made by the device is dependent in large part on the precision with which the acoustic impedance of this narrow circular slit varies with the mechanical adjustment of the gap, it is essential to have a precise means of varying the slit aperture and also to provide a construction in which the reactive components introduced by the slit and its immediate environment are a minimum.

According to the present invention, the valve disc 42 is mounted in spaced relation to the open end of sleeve 32 by means of struts 52 which extend both axially and inwardly from the sleeve end toward the rear face of the valve disc. The disc is of lesser diameter than that of sleeve 32 to provide clearance between the periphery of the disc and the walls of the valve seat insert 46. The forward edge of the disc has a conical surface 54 complementary to the seat 44 on insert 46, and a chamfered rear edge 55, with the supporting struts 52 merging with the rear face of the disc inwardly of the base of the chamfered edge, as best shown in FIG. 5, to provide passage for the acoustic waves around substantially the entire periphery of the disc. The regions between the diametrically-opposed struts (FIG. 4), define arcuate gaps between the ends of the sleeve 32 and the rear face of disc 42 which have a greater total area than that of the narrow circular slit between disc 42 and seat 44 when the slit is at the maximum opening employed in use. The relatively clear space for passage of the sound wave from chamber 30 around the edge of disc 42 to the slit enables the cavities on each side of the slit to operate substantially as ideal acoustic cavities, while the slit itself functions as a substantially pure acoustic resistance, relatively free of incidental reactive components.

The above-described slit construction makes it possible accurately to obtain the resistive component of the acoustic impedance as a function of the slit width over the desired range of impedances likely to be encountered in auditory examinations. Adjustment of the slit width is provided by a screw-threaded connection 60 between the sleeve 32 and the housing 48. To provide a smooth micrometer-type adjustment, a portion of the housing in the region of the threads is slotted at 61 to permit slight inward yielding so that any looseness in the threaded engagement with the sleeve 32 may be taken up by advancing the adjusting ring 62 onto the conical surface 64 to compress the threaded portion of the housing 48. The sleeve is also guided adjacent its tip by a seal ring within the valve seat insert 46.

During the operation of the bridge, the operator may hold the transducer portion in one hand and rotate the housing 48 with the other hand by a rolling movement of middle and index fingers in the region between flanges 70. When the proper slit width for the null setting is obtained, the acoustic resistance may be read or derived from indicia on scale sleeve 72 opposite the index mark on the shroud 74 carried by the end 36 of valve sleeve 32. Preferably the scale sleeve is made slightly out of round (see FIG. 6) so as to be in fairly tight frictional engagement with housing 48 to retain the setting arrived at during calibration though permitting relative adjustment if required.

The adjustable reactive component of the bridge is provided by chamber 80 of variable volume beyond the variable slit. This adjustable chamber is defined by cylindrical member 82, with a sliding plunger or piston 84 having a loop 86 for the operator's thumb. The plunger tube may be marked with volume indications. A resilient seal such as an O-ring or a spring-backed channel of resilient material provides an acoustically-tight sliding joint between plunger 84 and the walls of the chamber. The cylinder member 82, it will be noted, screws into the housing 48 and serves to clamp the valve seat insert 30 securely against a shoulder within the housing.

The transducer portion of the bridge is shown in detail in FIG. 7. The transducer element is of symmetrical configuration, having a central diaphragm 90 and appropriate electromagnetic actuating means on each side thereof for generating sound waves and emitting the sound energy from both sides of the diaphragm through apertures in end plates 92 into the open ends of tubes 14 and 16. It has been found that the mounting of the transducer within its housing plays an important part in the proper operation of the bridge. In particular, any clamping stresses affect the support of the diaphragm at its margin and result in appreciable changes in the acoustic characteristics of the bridge. As a consequence, in such arrangements even minor changes in the extent to which the housing clamp screws are tightened may adversely influence the performance of the bridge.

In the construction shown in FIG. 7, the transducer is not directly engaged by the rigid structure of the housing and tube assembly. Instead, the transducer is supported between resilient rings 94 which engage the end plates 92 and also provide an acoustic seal between the transducer passages and the ends of tubes 14 and 16. The transducer is positioned in proper axial alignment by a hollow block 93, preferably of non-metallic material, while permitting adequate freedom of movement in an axial direction. The tubes 14, 16 are secured in rigid circular members which may be tightly clamped within the cylindrical shell 98 without affecting the transducer within. Small passages 104, 106 in the members 96 communicate with the tubes 14 and 16 to transfer part of the acoustic energy in each tube to the output fitting 108. Small tubular inserts 110 in the aligned ends of these passages extend into the output fitting with their ends closely spaced to permit some relative movement between the output fitting and the transducer housing, while transmitting the separate sound energies into the common output passage 112 to a suitable null detector which may be electrical or a simple flexible tube to the operator's ears.

In performing an impedance measurement, the volume setting for chamber 30 will first be made, in the manner already described. Then, with the bridge properly inserted in the ear, an electrical signal of predetermined frequency and suitable intensity will be applied to the transducer through leads 114. The vibrating diaphragm will radiate sound energy via tube 14 into the ear canal toward the ear drum, and energy of opposite phase into the impedance-determining elements via tube 116. The operator will then vary, by sliding movement of the plunger 84 and by rotary adjustment of the housing 48, the reactive and resistive impedances to give the lowest signal at the null detector, as observed electrically or acoustically by means connected to bridge output fitting 108.

When the null setting has been determined, the reading of scale ring 72 and the volume setting for the plunger 84 may be converted into acoustic resistance and acoustic reactance respectively. While a formula exists for the conversion of slit dimensions into acoustic ohms, it is preferable to utilize a previously-prepared calibration curve from which may be ascertained the resistance in acoustic ohms as a function of the housing rotation determined from scale ring 72. Calibration of the acoustic resistance of the instrument is performed by reference to known acoustic impedances. The formula is of value, however, in demonstrating that for sufficiently small slit thicknesses, the reactance component can be neglected and the impedance of the slit becomes practically a pure resistance. For example, for a conical slit of 1 centimeter average diameter and a slit length in the direction of propagation of 0.1 centimeter, a slit thickness of 0.009 centimeter produces a resistance of approximately one hundred acoustic ohms, 0.004 centimeter a resistance of approximately one thousand acoustic ohms, and 0.0024 centimeter a resistance of approximately five thousand acoustic ohms. At a frequency of 100 cycles per second, the reactive impedances are 3.24, 6.81 and 12 acoustic ohms respectively for these slit thicknesses. As the frequency increases the reactive impedance values increase but not sufficiently to impair the usefulness of acoustic impedance measurements within the frequency ranges usually employed to perform diagnostic measurements on the ear.

The acoustic reactance provided by chamber 80 may be derived from the setting of plunger 84 when the null is achieved, by converting the chamber volume to acoustic reactance in accordance with the following expression:

$$X = \frac{1.42 \times 10^6 (\text{g./cm. sec.}^2)}{6.28 \times f \times V_2 (\text{cm.}^3/\text{sec.})}$$

Where $X$ is given in dyne sec./cm.$^5$, $f$ is the sound frequency, and $V_2$ is the volume of chamber 80.

It will be apparent from the foregoing description and accompanying drawings that applicant has effected significant improvements in acoustic apparatus for auditory measurements, in respect to both the variable impedance elements and the transducer mounting. By reason of these improvements, the ease and precision of the adjustments have been facilitated and the accuracy of the results materially enhanced.

I claim as my invention:

1. In an acoustic bridge for measuring acoustic impedance, a variable acoustic impedance comprising a housing, a conical valve seat within the housing, a sleeve slidably adjustable within said housing, a disc mounted on the sleeve in axially-spaced relation to an end thereof, the tube end being open rearwardly of the disc, said disc having a conical surface complementary to the conical seat, struts intermediate the sleeve and the disc and supporting said disc on the sleeve, said struts extending axially and inwardly from the sleeve to the disc rearwardly of the conical surface thereon, and screw-threaded means for adjusting the sleeve axially of the housing to vary the slit opening between disc and seat and thereby adjust the acoustic resistance of said opening.

2. Apparatus as set forth in claim 1 wherein the struts which support the disc on the sleeve are of arcuate contour.

3. Apparatus as set forth in claim 1 wherein the struts which support the disc on the sleeve intersect the rear of the disc inwardly spaced from the outer margin of the disc.

4. Apparatus as set forth in claim 1 wherein the disc has a chamfered rear edge and the supporting struts intersect the rear of the disc adjacent the base of the chamfer.

5. Apparatus as set forth in claim 1 wherein the disc is supported by two diametrically-opposed struts.

6. An acoustic bridge for measuring acoustic impedance comprising a transducer having a radiating element and symmetrical acoustic passages on opposite sides thereof,
- a housing for said transducer, said housing having end members, symmetrical tubes within said end members and extending in opposite directions therefrom,
- means for securing the end members in rigid spaced relation with the ends of the tubes in spaced, axially-aligned relation within the housing,
- the transducer being disposed intermediate the end members with its acoustic passages aligned with the tubes,
- and resilient sealing means on each side of the transducer intermediate the transducer and the tube ends, the transducer being axially positioned by said resilient sealing means.

7. Apparatus as set forth in claim 6, including means engaging the periphery of the transducer to position the transducer radially of the housing, said means being axially spaced from the transducer.

8. Apparatus as set forth in claim 6, including means disposed peripherally outwardly of the transducer and the sealing means and out of contact therewith in an axial direction, said means positioning the transducer and sealing means in concentric relation with the ends of the tubes.

9. In an acoustic bridge for measuring acoustic impedances by comparison of an unknown acoustic impedance against a known acoustic impedance having adjustable resistive and reactive acoustic impedances,
- a transducer having a radiating element and acoustic passages on each side thereof,
- a first tube coupled to one of said passages and a second tube coupled to the other of said passages,
- a housing containing the adjustable acoustic impedances,
- said housing comprising a rotatable member,
- a sleeve within said housing,
- screw-threaded connections between housing and sleeve for relative axial adjustment of the parts,
- the sleeve surrounding the end portion of the second tube in telescoping sliding relations and defining a first adjustable chamber between the tube end and the end of the sleeve,
- a cylindrical valve seat inserted within the housing,
- a valve seat on said insert,
- a disc on the sleeve, said disc being mounted in axially-spaced relation to the open end of the sleeve, the valve seat and the disc having complementary conical surfaces defining a narrow circular slit adjustable by relative rotation of housing and sleeve,
- a cylindrical member defining a second chamber on the opposite side of the slit from the first chamber,
- a sliding plunger within said member for adjusting the volume thereof,
- and screw-threaded connections for advancing the cylindrical member axially within the housing against the valve seat insert for demountably securing both the valve seat insert and the cylindrical member within the housing.

10. Apparatus according to claim 9 including a scale sleeve surrounding the housing and adjustably rotatable with respect thereto, said scale sleeve being slightly out of round and in frictional engagement with the housing in at least two regions.

11. Apparatus according to claim 9 wherein resilient sealing means are disposed between the second tube and the sleeve, between the plunger and the cylindrical member, and between the sleeve and the valve seat insert to provide acoustic seals while permitting relative sliding adjustment of the parts.

12. Apparatus according to claim 9 wherein the housing in the region of the threaded engagement with the sleeve is slotted in an axial direction, the extreme end of the housing being circumferentially continuous, a conical surface around the portions of the housing peripherally intermediate said slots, and an adjusting ring surrounding the housing and axially adjustable into engagement with the conical surface on the housing to compress the housing inwardly in the region of the slotted portions thereof.

References Cited by the Examiner

UNITED STATES PATENTS

| | | | |
|---|---|---|---|
| 3,024,783 | 3/1962 | Timcke | 128—2 |
| 3,237,711 | 3/1966 | Bates et al. | 181—.5 |
| 3,245,403 | 4/1966 | Lieberman | 128—2 |

RICHARD A. GAUDET, *Primary Examiner.*

SIMON BRODER, *Examiner.*